(12) United States Patent
Zoldi

(10) Patent No.: US 9,704,195 B2
(45) Date of Patent: Jul. 11, 2017

(54) MULTIPLE FUNDING ACCOUNT PAYMENT INSTRUMENT ANALYTICS

(75) Inventor: Scott M. Zoldi, San Diego, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 0 days.

(21) Appl. No.: 13/198,310

(22) Filed: Aug. 4, 2011

(65) Prior Publication Data

US 2013/0036036 A1 Feb. 7, 2013

(51) Int. Cl.
G06Q 40/00 (2012.01)
G06Q 30/02 (2012.01)
G06Q 20/34 (2012.01)

(52) U.S. Cl.
CPC ........... *G06Q 40/00* (2013.01); *G06Q 20/354* (2013.01); *G06Q 20/3572* (2013.01); *G06Q 30/0224* (2013.01); *G06Q 30/0269* (2013.01)

(58) Field of Classification Search
CPC combination set(s) only.
See application file for complete search history.

(56) References Cited

U.S. PATENT DOCUMENTS

| 5,819,226 | A | | 10/1998 | Gopinathan et al. | |
|---|---|---|---|---|---|
| 5,859,419 | A | * | 1/1999 | Wynn | G06Q 20/341 235/380 |
| 6,330,546 | B1 | | 12/2001 | Gopinathan et al. | |
| 6,658,393 | B1 | | 12/2003 | Basch et al. | |
| 8,639,629 | B1 | * | 1/2014 | Hoffman | G06Q 20/20 705/44 |
| 2005/0108178 | A1 | * | 5/2005 | York | 705/75 |
| 2005/0278192 | A1 | | 12/2005 | Cantini et al. | |
| 2008/0242274 | A1 | * | 10/2008 | Swanburg | G06Q 20/3223 455/414.1 |
| 2009/0037333 | A1 | * | 2/2009 | Flitcroft et al. | 705/44 |

(Continued)

FOREIGN PATENT DOCUMENTS

| JP | 2006518895 A | 8/2006 |
|---|---|---|
| JP | 2009541818 A | 11/2009 |

(Continued)

OTHER PUBLICATIONS

International Search Report and Written Opinion dated Oct. 10, 2012, for corresponding PCT application No. PCT/US2012/049399.

(Continued)

*Primary Examiner* — William Rankins
(74) *Attorney, Agent, or Firm* — Mintz Levin Cohn Ferris Glovsky and Popeo, P.C.

(57) ABSTRACT

A system and method for multiple funding account payment instrument analytics is disclosed. A payment instrument profile is generated for a payment instrument that characterizes past activity on the payment instrument and past activity across one or more funding accounts associated with the payment instrument. Current activity on the payment instrument and current activity across one or more funding accounts associated with the payment instrument are monitored to detect an abnormality against the payment instrument profile. A fraud score for the current activity on the payment instrument and current activity across one or more funding accounts associated with the payment instrument is generated. The fraud score is based on a quantified extent of the abnormality.

19 Claims, 3 Drawing Sheets

| PID (Payment Instrument ID)<br>- PID variables<br>- Cross Funding Account Variables | DDA |
|---|---|
| | - DDA variables |
| | Savings |
| | - Savings Variables |
| | Home Equity |
| | - Home Equity Variables |
| | Loan |
| | - Loan Variables |
| | Points |
| | - Points Variables |
| | Credit |
| | - Credit Variables |
| | - Etc. |

(56) References Cited

U.S. PATENT DOCUMENTS

| | | |
|---|---|---|
| 2010/0036770 A1 | 2/2010 | Fourez et al. |
| 2010/0078475 A1* | 4/2010 | Lin et al. .................... 235/380 |
| 2010/0094767 A1 | 4/2010 | Miltonberger |
| 2010/0274720 A1* | 10/2010 | Carlson ............... G06Q 20/202 705/44 |
| 2013/0018795 A1* | 1/2013 | Kolhatkar et al. ............. 705/44 |

FOREIGN PATENT DOCUMENTS

| | | |
|---|---|---|
| WO | WO-2007/125316 A2 | 11/2007 |
| WO | WO-2010/046659 A2 | 4/2010 |

OTHER PUBLICATIONS

Chen, Fei, et. al. "Incremental Quantile Estimation for Massive Tracking." *KDD '00 Proceedings of the Sixth ACM SIGKDD International Conference on Knowledge Discovery and Data Mining*, Boston, MA Aug. 20-23, 2000. pp. 516-522.

Tierney, Luke. "A Space-Efficient Recursive Procedure for Estimating a Quantile of an Unknown Distribution." *SIAM Journal on Scientific and Statistical Computing*, vol. 4, No. 4, 1983, pp. 706-711.

\* cited by examiner

| PID (Payment Instrument ID) | DDA |
| --- | --- |
| - PID variables | - DDA variables |
| - Cross Funding Account Variables | Savings |
| | - Savings Variables |
| | Home Equity |
| | - Home Equity Variables |
| | Loan |
| | - Loan Variables |
| | Points |
| | - Points Variables |
| | Credit |
| | - Credit Variables |
| | - Etc. |

Merchant ID

| index | Merchant ID |
|---|---|
| 1 | 109891asjkls |
| 2 | 2398uu2na1 |
| ... | ... |
| 11 | 1092kj1j2112 |
| 12 | 9mn2m1i1h1 |
| 13 | Mksm01029 |
| 14 | 29m1k2nkm |

Frequency Table

| index | Frequency |
|---|---|
| 1 | 0.2 |
| 2 | 0.7 |
| ... | ... |
| 11 | 3.1 |
| 12 | 0.9 |
| 13 | 2.3 |
| 14 | 0.4 |

Ranking Table

| Ranking | Index |
|---|---|
| 1 | 11 |
| 2 | 13 |
| ... | ... |
| 11 | 12 |
| 12 | 2 |
| 13 | 14 |
| 14 | 1 |

FIG. 3

MULTIPLE FUNDING ACCOUNT PAYMENT INSTRUMENT ANALYTICS

TECHNICAL FIELD

The subject matter described herein relates to fraud detection, and more particularly to analytics systems and methods for detecting fraud related to transactions by multiple funding account payment instruments.

BACKGROUND

In the area of financial payments, there is increasingly a consolidation of payment methods. Historically, a credit or debit card is linked to a single funding account. Analytic models have typically been developed with this "one card, one account" arrangement, either implicitly or explicitly. Today, financial institutions such as banks are introducing new payment devices in the form of plastic cards or electronic and wireless communication mobile devices that can be linked to one or more financial accounts such as, credit, debit, savings, points/mileage accounts, etc. However, traditional analytic systems such as fraud detection are still designed and optimized for single-account cards.

Funding accounts can be dynamically chosen for individual payments with such devices. For example, applications that run on mobile devices enable the devices to initiate payments through one or more funding accounts. This shift from one-card-one-account to one-card-multi-account poses considerable challenges to current analytic approaches and also provides an interesting new analytical opportunity to improve the protection for these payment instruments and subsequently the one or more associated funding accounts from fraudulent activity. In the card example, a multi-funding payment instrument can effectively be viewed as several cards in a wallet linked to different accounts. Traditional payment fraud detection methods may not be well-suited to monitor fraud as they assume a single linked account and generally do not reflect the selection of funding account and patterns across funding accounts.

SUMMARY

This document presents a fraud analytic system and method applied to a financial transaction device, such as a card or a mobile communication device (hereafter, simply "mobile device"), that is used as access to one or more funding accounts to execute a financial transaction. Fraud detection can benefit within a specific scenario, i.e. use of a specific funding account, if usage patterns are within normal variances associated with the other funding accounts, and if the selection of the specific funding account is normal for this specific type of transaction. For example, if a cardholder always apportions certain types of transactions to a debit account, credit account, or mileage/points account, and there is a change in that behavior coupled with other fraudulent behavior patterns, this information may point to a fraudster who is unfamiliar with such apportioning of the transactions across the multiple funding accounts.

In addition to third party fraud (compromise/takeover) events, the multi-funding payment instrument analytics can also monitor and detect first party fraud and allow for customer management. As such, a system for multi-funding payment instruments provides a significantly broader view into the customer's array of funding accounts through the monitoring of a single card. The system and method can enable visibility to funding of demand deposit accounts (DDA)/current accounts from savings accounts and subsequently see large debit transactions which can help make sense of any newly transferred dollars to the DDA account. The system and method can also provide for an increase in utilization across funding accounts, including abrupt changes that could point to a greater transaction credit risk, or in some cases an early warning to bust-out activity associated with first party fraud across one or more accounts that are accessed by the multi-funding payment instrument. These features are enabled through a new payment instrument profile that is described in detail below.

In one aspect, a computer-implemented method, using one or more processors, includes the steps of generating a payment instrument profile that characterizes past activity on a payment instrument and past activity across one or more funding accounts associated with the payment instrument, and monitoring current activity on the payment instrument and current activity across one or more funding accounts associated with the payment instrument to detect an abnormality against the payment instrument profile. The method further includes generating a fraud score for the current activity on the payment instrument and current activity across one or more funding accounts associated with the payment instrument, the fraud score being based on a quantified extent of the abnormality.

In another aspect, a computer-implemented method, using one or more processors, includes the steps of monitoring past activity on a payment instrument and past activity across one or more funding accounts associated with the payment instrument, generating a payment instrument profile that characterizes the past activity on a payment instrument and the past activity across one or more funding accounts associated with the payment instrument, and monitoring current activity on the payment instrument and current activity across one or more funding accounts associated with the payment instrument to detect an abnormality against the payment instrument profile. The payment instrument profile is comprised of a plurality of variables that characterize the payment instrument and the one or more funding accounts associated with the payment instrument.

In yet another aspect, a system for multiple payment account funding analytics includes one or more processors, and a tangibly embodied machine-readable medium that embodies instructions that can be executed by the one or more processors. The instructions cause the one or more processors to generate a payment instrument profile that characterizes past activity on a payment instrument and past activity across one or more funding accounts associated with the payment instrument, monitor current activity on the payment instrument and current activity across one or more funding accounts associated with the payment instrument to detect an abnormality against the payment instrument profile and generate a fraud score for the current activity on the payment instrument and current activity across one or more funding accounts associated with the payment instrument, the fraud score being based on a quantified extent of the abnormality.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

Although this document will focus on multi-funding payment instrument analytics for payment cards, the same concepts are equally applicable to other multi-funding payment instruments, such as mobile devices that communicate via one or more wireless communication channels.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 1 is a representation of a payment instrument profile.

FIG. 3 is a representation of a behavior sorted list where the frequent visited merchants are determined within the transaction profile through an recursive approximation method which allows efficiency in determining favorites.

Like reference symbols in the various drawings indicate like elements.

DETAILED DESCRIPTION

Figure 2:
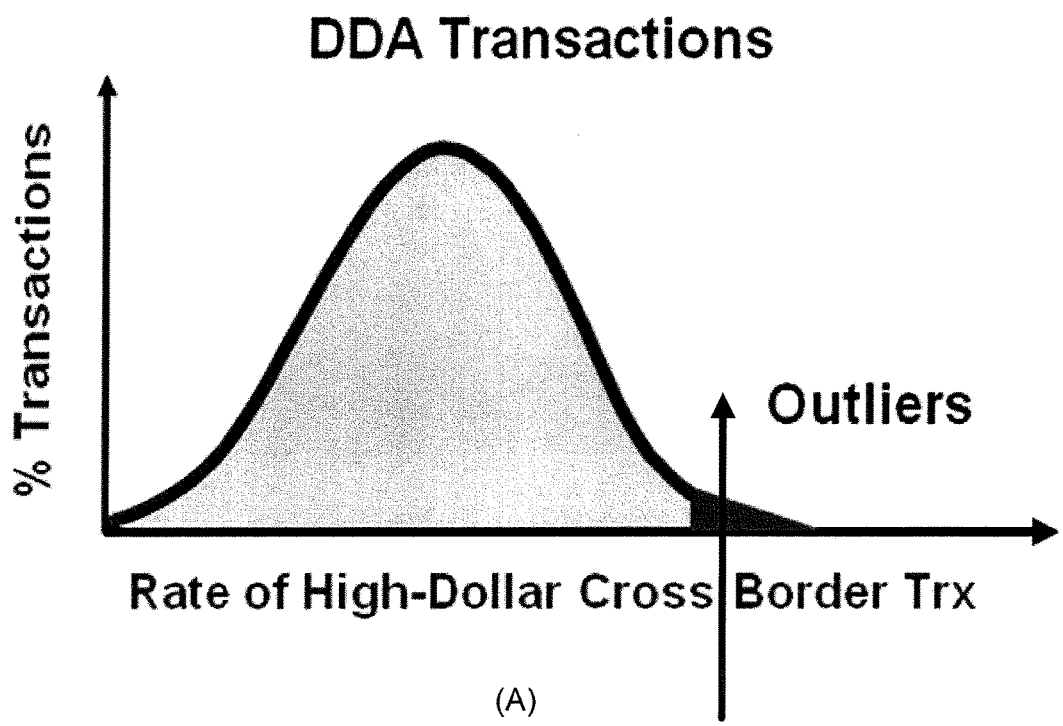
FIG. 2 is a representation of a variable distribution for 'Rate of High-Dollar Cross Border Transactions' when looking at only transactions funded by a DDA account vs. across all transactions irrespective of the funding account.
Figure 2:
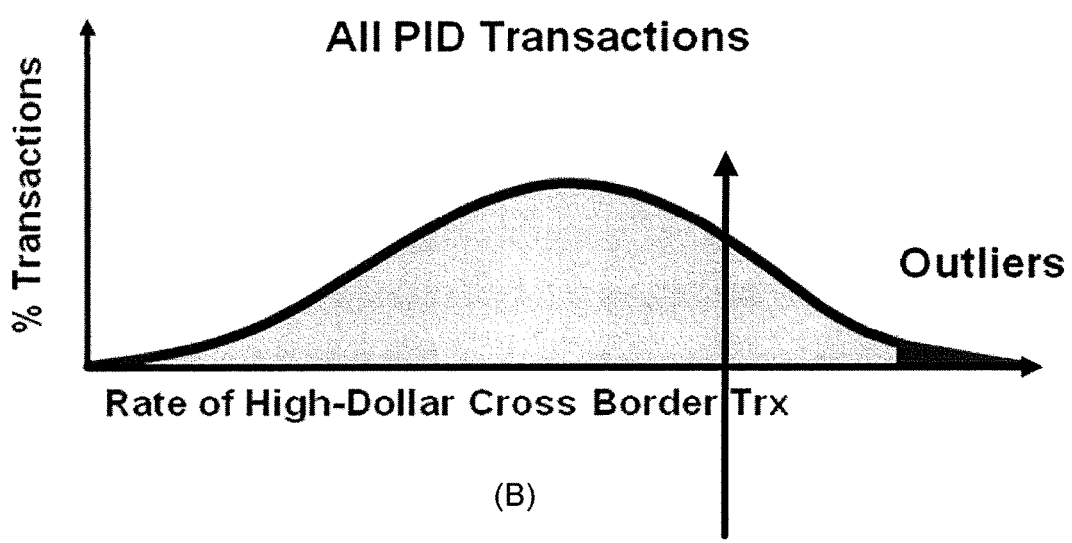

This document describes a computer-implemented fraud analytic system and method for a payment instrument, such as a card, mobile device, or other financial transaction device, that is used to access multiple funding accounts to execute a financial transaction.

Payment Instrument Profile

To effectively monitor a payment instrument associated with multiple accounts, transaction behavior of the payment instrument is segmented between overall transaction volume initiated on the payment instrument and those transactions that are linked to different funding accounts.

FIG. 1 shows an example of a multi-funding payment instrument (PID) profile, which includes PID variables related to an overall usage of the payment instrument and separate profile segments tracking transaction activity initiated by the payment instrument within different funding accounts. Variables contained within the profile pertain to the payment instrument overall, across funding accounts, and behavioral variables specific to the funding account in isolation. This allows a complete view of activity made by the payment instrument and incorporates the selection of funding accounts and behavioral patterns for different transactions.

The PID profile enables tracking of the activity on the payment instrument within one memory structure, and also to characterize activity across one or more funding accounts associated with the payment instrument. Consumers typically use different funding accounts for different types of transactions, for example, electronics on credit, groceries on debit, daycare charges on DDA, and restaurant on points. Characterizing fraud requires the ability to accurately summarize the customer behavior with respect to the selection of different funding accounts associated with types of transactions, days of the week, pay check cycles, etc. which can aid in the rapid detection of the use of the card by someone other than the legitimate owner of the payment instrument. The PID profile allows creation of an architecture that uses PID variables, cross-funding account variables, and funding account subprofiles, each of which are described in further detail below.

PID Variables: These can be a variety of variables associated with financial and non-financial transactions associated with the payment device. These variables give the global view of all transaction activity associated with the payment instrument (i.e. a card in the payment card space) independent of the funding account chosen. These variables track the typical behavior associated with the payment instrument, and detect changes in behavior indicative of fraud.

Cross-Funding Account Variables: These variables provide visibility to patterns of use across funding accounts accessible by the payment instrument. As an example variables can track logically linked transactions such as funds deposited at an ATM to a DDA account followed by a subsequent debit card transaction. These variables also include a determination of the likelihood that a funding account is used for a particular type of transaction based on the history of funding selections for recent historical transactions.

Funding Account Subprofiles: These segments of the PID profile are focused entirely on usage patterns associated with the payment instrument when a particular funding account is used in the transaction. This includes monitoring normalcy of the transactions for the selected funding account using techniques such as "favorites list" of merchants, ATMs, countries, etc. It also includes tracking quantiles of variable distributions to detect outliers in the transaction activity within the funding account profile segment.

This architecture enables, in one profile, to summarize transaction activity on a payment instrument independent of the funding account, summarize activity only related to one or more funding accounts, and summarize patterns of use across funding accounts. This provides a connected decisions approach to connecting information associated with one or more funding accounts. Having such access to more than one funding account is like having the ability to profile a customer's wallet for fraud detection. This provides a much improved use of behavioral and transaction data together in real-time associated with the selection of funding accounts to improve the fraud detection decision on the payment instrument. It also allows an opportunity to stop fraud on all funding accounts when a possible fraud is detected on only one of the funding accounts. Next, the management of the funding account profile segments is discussed.

Management of Funding Account Profile Segments

As illustrated in FIG. 1, there are up to N funding account profile segments. Given finite memory space associated with the PID profile, a methodology to manage the number of funding accounts that are actively monitored is needed. In one implementation, the profile can be sized such that it meets the requirements around a maximum number of funding accounts. However, this can be impractical and requires a way to manage the profile segments if a customer has in excess of the N funding accounts.

In a preferred exemplary implementation, the profile segment management can be handled through a recycling algorithm. A frequency metric indicates the frequency with which a funding account is used. Low frequency funding accounts (including inactive or closed ones) can be recycled in favor of new funding accounts. The frequency for each funding account can be recomputed on every transaction on the payment instrument according to an equation such as:

$$f_j = \alpha \times f_{j-1} + \beta_j$$

where $f_j$ and $f_{j-1}$ are the values of the decayed frequency for a particular funding account after the j'th and (j−1)'th transactions, α is a value between zero and one and is used to reduce the current frequency, and $\beta_j$ is zero if the j'th transaction did not involve the particular funding account or one if the j'th transaction did involve the particular funding account.

Based on the frequency metric for each funding account, when a new funding account appears, the value of the frequencies are used to determine if any funding account profile segment meets a particular threshold of non-use, ϵ where if f<ϵ. If the recycling threshold is met then that specific funding account profile segment is initialized and the new funding account takes that profile segment in the PID profile. This is deals with a limited capability to include all funding account profile segments, and also to recycle funding account profile segments when a funding account is no longer linked to the payment instrument.

When a transaction comes in, the first check is to determine if the funding account exists in the N maintained funding account profile segments. If so, then the analytics updates the PID variables, cross-funding account variables, and then the specific funding account variables. If the funding account does not exist, and not all N slots are used, then a slot is initialized and updated. If the funding account does not exist and all N slots are used, and no slots are available for recycling per the threshold f<ϵ then only the PID profile variables are updated and a different model score calculation will be used for this operational use-case.

Multi-Funding Payment Instrument Analytics

The first step in the computation of a payment instrument score is to create specific variables associated with the payment instrument independent of the funding account. In the following sections, the segmentation of the transactions between funding accounts and the associated analytics is discussed. However, in any payment instrument score, it is also important to have variables that are monitoring the use of the payment instrument independent of the funding account used to fund the payment. As an example, if a transaction is made at an ATM to receive money using a debit funding account, and then five minutes later a purchase is made using a credit funding account, it is of great value to understand the transaction behavior across the funding accounts and in this particular example geo-location information associated with each transaction.

When the payment card (or mobile device) becomes an access device to one or more funding accounts, the patterns utilized in a determination of fraud include out-of-pattern accesses across funding accounts, as well as out-of-pattern and risky behavior associated with a specific funding account. There are a wide variety of analytic techniques that can be applied when using the proposed funding account profile segments within a payment instrument transaction profile, however, four preferred analytic techniques are described below.

Technique 1: Bayesian Statistics

To determine shifts in patterns in the usage of the payment instrument which may be indicative of fraudulent behavior, requires determining the probability of a funding account being used based on the details of the current transaction and transaction history of the payment instrument. A natural method to estimate the probability of a particular funding account being selected to fund the payment is through using Bayes theorem.

$$P(FundingAccount | Variable) = \frac{P(Variable | FundingAccount) P(FundingAccount)}{P(Variable)}$$

The equation above expresses the probability that a particular funding account is selected for a transaction based on specific attributes of the transaction or the associated variables in the transaction profile, such as transaction amount or average frequency of transactions over a timeframe, such as a week. The probability that the funding account is selected is expressed in terms of three quantities:

P(Variable|FundingAccount)

which is the probability of seeing the variable amount, say a $7 transaction amount within a particular funding account's transaction history.

P(FundingAccount)

which is the probability across all transactions made using the payment instrument that a particular funding account is selected independent of the details of the transaction.

P(Variable)

which is the probability of seeing the transaction amount, say $7, across all recent transactions on the payment instrument independent of funding account.

These three quantities are approximated either through keeping a small history of transactions in the payment instrument profile, such that the three probabilities can be computed directly, or can be computed through approximate methods recursively. The value of the Bayesian technique is that the probability of using a particular funding account for different types of transactions can be estimated. Then the probability, whether high or low, can be used along with other variables in the model to determine whether the transaction is likely fraud-based on whether it is likely a customer would have selected this particular funding account for the current transaction based on their past transaction history.

Examples variables that could be used in the equations above include:

TRANSACTION AMOUNT Merchant category codes (MCC) or MCC groupings
Card Not Present TRANSACTION AMOUNT
Cross Border TRANSACTION AMOUNT
Cross Border Transaction Frequency
Transaction Frequency Variables Other variables can also be used. This technique generates a set of predictors to determine whether the funding account selected is of low probability based on recent transactions. A low probability indicates abnormal use.

Technique 2: Self-Calibrating Outlier Analytics

Once the probability of a particular funding account being selected is estimated, it needs to be understood whether the transaction and associated profile variables are outliers within the set of transactions for a funding account, according to funding account and also overall on the payment instrument distributions.

Determining the outlier values of the profile variables associated with the transactions for a funding account in real time allows the combined risk of a change in the selected funding account to be determined, coupled with whether that transaction can be determined to be an outlier based on the history of transactions for that selected funding account.

FIG. 2 is a representation of a variable distribution for 'Rate of High-Dollar Cross Border Transactions' when looking at only transactions funded by a DDA account vs.

across all transactions irrespective of the funding account. This analysis allows an indication of what might be an outlier in DDA accounts, but would not be an outlier overall across funding accounts, and if coupled with a change in typical funding account selection it might help establish normalcy.

To determine the outlier values, the outlier point in the distribution of values of the variables needs to be quantified, where if the variable exceeded that point it would be considered an outlier. In some implementations, a 95% quantile of the distribution is used to determine the threshold where the value is considered an outlier. The formula below is used as a simple unconditional re-scaling across all independent variables $$q(x_i | \theta) \equiv \frac{x_i - \theta_{i,1}}{\theta_{i,2}} \in [0, C]$$

where $((\theta_{i,1}, \theta_{i,2}) \in \theta)$ are location and scale parameters respectively of the computed distribution of independent profile variable $x_i$. The scaled value is bounded between 0 and some constant C to protect the analytics from extreme outlier values.

It is important that these distributions are computed in real-time and adjust with each transaction both on the payment instrument overall and within the specific funding account. The disclosed method is a result of real-time estimates of the scaling parameters $(\theta_1, \theta_2) \in \theta$ using a customer's own data. To compute online percentile estimators of the variables, several techniques can be used, as follows.

For a given variable x, its r-th percentile $\bar{x}^r$ is computed on the fly as the observations of x come in. Formally, the online estimation technique works iteratively as follows. An iteration consists of observing M consecutive events, where M≥1 is a free parameter. At the n-th iteration, an estimate of $\bar{x}^r$ is updated; this estimate is denoted by $\bar{x}_n^r$ at the n-th iteration. The i-th observation in the n-th iteration is denoted as $x_n^i$, where i is in [1, M]. At the n-th iteration, a density estimate $f_n$ is computed for the variable x at the r-th percentile using the following equation:

$$f_n = (1 - w_n)f_{n-1} + w_n \frac{\sum_{i=1}^{M} 1\{|x_n^i - \bar{x}_{n-1}^r| \le c_n\}}{2c_n M}$$

where $1\{\cdot\}$ is an indicator function that takes the value of 1 if the condition inside the curly brackets is satisfied and 0 otherwise. The series $w_n$ and $c_n$ must satisfy some convergence criteria. Among many others, one choice is $w_n=1/n$ and $c_n=1/\sqrt{n}$.

After $f_n$ is computed, $\bar{x}_n^r$ is obtained as follows:

$$\bar{x}_n^r = \bar{x}_{n-1}^r + w_n \frac{r - \sum_{i=1}^{M} 1\{x_n^i \le \bar{x}_{n-1}^r\}/M}{e_{n-1}}$$

where $e_n = \max\{f_n, f_0/\sqrt{n}\}$ and $f_0$ is an initial value of $f_n$.

In some implementations, $w_n$ may be time-decayed as opposed to event decayed. A time decayed version of $w_n$ may be more appropriate for some fraud applications. Also the estimates above would be re-initialized when a new funding account profile segment is added. This allows estimates to be properly updated and computed when new funding accounts are associated with the payment instrument.

Utilization of the self-calibrating analytics technique then requires recursive estimates of the values of $\theta_{i,1}$ and $\theta_{i,2}$ (here it is assumed two parameters to scale the variables) associated with each of the x, profile variables. These $\theta_{i,1}$ and $\theta_{i,2}$ are computed both overall for all transactions and within specific funding accounts. In this sense, one can based on the estimates of the quantiles determine outlier values of the profile variables both for the funding account selected and overall for the payment instrument and use this in the determination of a fraud score. Examples of variables that can be used to compute their outlier values include:
  a. Transaction Amount
  b. Ratio of Transaction Amount to Daily Average Transaction Amount
  c. Card Not Present (CNP) Transaction Amount
  d. Ratio of CNP Transaction Amount to Daily Average CNP Transaction Amount
  e. Cross Border (CB) Transaction Amount
  f. Ratio of Transaction CB Transaction Amount to Daily Average CB Transaction Amount
  g. Ratio of Transaction Amount 1 day to 1 week
  h. Ratio of Card Not Present Transaction Amount 1 day to 1 week
  i. Ratio of Cross Border Transaction Amount 1 day to 1 week
  j. Frequency of Transactions
  k. Frequency of International Transactions
  l. Card Not Present Frequency of Transactions
  m. Cross Border Frequency of Transactions
  n. Etc.

Technique 3: Favorite Lists

Determination of "favorites" within the transaction history is another technique for detecting fraud on the payment instrument. Customers, irrespective of how they decide to fund a transaction, will often not change their preferences in terms of what gas stations, ATMs, grocery stores, and restaurants they frequent. Normalcy is an important component of the determination of whether or not a transaction is fraud or non-fraud. A transaction that appears out of pattern, but at a frequently-visited merchant, either within the funding account transaction history or that of another funding account, can be important to establish normalcy. Within fraud applications, it is not practical to access a database of past customer transactions to determine if a particular merchant or ATM is a favorite. Therefore, recursive methods are used to compute favorites in real-time as customer transactions pass through the analytic model in production.

For illustration purposes, consider the following an example of a behavior sorted List. FIG. 3 shows an example of a frequent-merchant ID List. A frequency-ordered list is maintained for the merchant IDs associated with the frequent spending behavior of a cardholder.

The merchant ID table and frequency table are coupled via common indices. From the tables shown in FIG. 3, it can be determined whether the merchant in the current transaction is in the table and its ranking. Favorites typically are defined to be ranked within the highest third to half of the table. The bottom ranked merchant IDs are not considered 'favorites' for reasons given below in the description of the recursive algorithm. As an example, merchant Mksm01029 is indexed in position #13, but has a frequency of occurrence of 2.3, and is the $2^{nd}$ most common favorite merchant ID.

Operationally as each new transaction is processed by the model, the merchant ID table is queried to determine whether the merchant ID in the current transaction is in the list and if so the rank of the merchant ID is retrieved from the ranking table. Then, various variables are calculated based on whether the merchant ID is deemed a favorite or not, favorites establish normalcy and a lower risk of the transaction and subsequently a lower risk in the associated transaction profile. Once the query is complete, then the tables are updated as follows:

All the frequencies in the frequency table are decayed by a multiplicative factor $\beta$, $0<\beta<1$;

Then, the merchant ID table and frequency table are updated as follows:
 a. If the current merchant ID is not in the merchant ID table, then least-frequent merchant ID (determined by the ranking table) is replaced with the current merchant ID if the least frequent merchant ID's frequency (based on the frequency table) is less than a threshold $\delta$, $$0 < \delta < \frac{1}{1-\beta}$$

(NOTE: there are a multitude of other implementations for determining the threshold). If replaced, the frequency of the current merchant ID is initialized to be $\alpha$.
 b. If the current merchant ID is already in the merchant ID table, then its frequency is increased by $\lambda$.

Finally, the ranking table is updated accordingly to reflect any changes to the ranking of merchant IDs based on the update.

From the frequency update algorithm described above, it can be seen that $\beta$, $\delta$, $\lambda$ are tunable parameters, as is the size of the table n (the example in FIG. 3 used 14) and the definition of favorite which is an integer fraction of n, typically between ⅓n and ½n.

The types of favorites entities that can be monitored associated with payment instrument and its funding accounts include merchantID, ATM TerminalID, country code, and CNP merchantID. As transactions are computed, favorites are investigated associated with the selected funding account, other funding accounts, and overall. This allows for proper treatment of an out-of-pattern funding account choice where the transaction is still normal in terms of the 'favorites' associated with the customer.

Technique 4: Cross-Funding Account Dynamics

Another area of interest is to monitor similarity or differences in the behaviors across funding accounts. As an example, if the transaction activity is increased in all the funding accounts this could indicate a consistent increase in spending capability, and if done within all the funding accounts and in pattern for selected funding accounts and favorites, may be normal. Whereas, if there are out of pattern transactions and volumetric changes across all funding accounts this may be related to payment instrument takeover or first party fraud. Therefore, volume changes across funding accounts and normalcy in transactions can be tracked, and one or more funding accounts that are primarily responsible for an overall increase in spending can be determined.

Likewise, an increase in activity in one funding account associated with a decrease in another may point to an incentive to use a particular funding account such as credit, debit, or DDA based on points/rewards or other market dynamics. Therefore, understanding the context of the volume or dollar volume changes in the funding accounts and linking to favorites helps to better assess true fraud risk associated with the payment instrument.

Finally, although the goal of a payment instrument analytic solution is to produce a single score for the payment instrument, the system and method can produce sets of individual funding account scores. These sets can be mini-models that score the funding account in a silo fashion. This can enable the funding account score to be compared to, incorporated within, and used in rules strategies with the overall payment instrument score.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network) or communication interface for receiving data representing activity related to the payment instrument or one or more funding accounts related to the payment instrument.

Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

The invention claimed is:

1. A computer-implemented method comprising:
    receiving, using one or more processors, a payment instrument profile that characterizes past activity on a payment instrument used for a transaction and past activity across one or more funding accounts associated with the payment instrument, the one or more funding accounts being used to pay for the transaction in real time or subsequent to the transaction, data associated with the at least one funding account of the one or more funding accounts being removed from the payment instrument profile in favor of a new funding account when the at least one funding account is inactive, the at least one funding account being inactive when the at least one funding account is accessed at a frequency less than a threshold;
    computing, using the one or more processors, a probability of a selected active funding account of the one or more funding accounts being used for a financial transaction that is a part of a current activity on the payment instrument and a current activity across the one or more funding accounts; and
    analyzing, using the one or more processors applying a self-calibrating outlier analytics technique, the current activity on the payment instrument and the current activity across the one or more funding accounts against the probability to detect an outlier value characterizing an abnormality against the payment instrument profile.

2. The computer-implemented method in accordance with claim 1, wherein the analyzing using the one or more processors includes: computing a favorites list of activity based on the payment instrument profile and the one or more funding accounts, the favorites list of activity representing a normalcy of behavior of a user of the payment instrument.

3. The computer-implemented method in accordance with claim 1, wherein the analyzing using the one or more processors includes determining one or more similarities or one or more differences in behaviors of a user of the payment instrument across the one or more funding accounts.

4. A computer-implemented method comprising:
    analyzing, using one or more processors of at least one computing system, past activity on a payment instrument used for one or more transactions and past activity across a plurality of funding accounts associated with the payment instrument, the plurality of funding accounts being used to pay for the one or more transactions in real time or subsequent to the one or more transactions;
    generating, using the one or more processors, a payment instrument profile by compiling the past activity on a payment instrument and the past activity across the plurality of funding accounts in a single memory structure, data associated with the at least one funding account of the plurality of funding accounts being removed from the payment instrument profile in favor of a new funding account when the at least one funding account is inactive, the at least one funding account being inactive when the at least one funding account is accessed at a frequency less than a threshold; and
    monitoring, using the one or more processors, current activity on the payment instrument and current activity across the plurality of funding accounts to detect an abnormality against the payment instrument profile, the abnormality being an outlier value determined by analyzing the current activity on the payment instrument and the current activity across the plurality of funding accounts against a probability of a funding account selected from the plurality of funding accounts being used for a financial transaction associated with the current activity on the payment instrument and current activity across the plurality of funding accounts.

5. The computer-implemented method in accordance with claim 4, further comprising:
    generating, using the one or more processors, a fraud score for the current activity on the payment instrument and current activity across the plurality of funding accounts, the fraud score being based on a quantified extent of the abnormality.

6. The computer-implemented method in accordance with claim 4, wherein the payment instrument profile comprises a plurality of variables that characterize the payment instrument and the plurality of funding accounts.

7. The computer-implemented method in accordance with claim 6, wherein the plurality of variables includes payment instrument identifier variables associated with financial and non-financial transactions performed using the payment instrument.

8. The computer-implemented method in accordance with claim 7, wherein the plurality of variables includes cross-funding account variables that characterize patterns of use and interrelationships of each of the plurality of funding accounts.

9. The computer-implemented method in accordance with claim 8, wherein the plurality of variables includes funding account sub-profiles that characterize patterns of use of the payment instrument when a funding account selected from the plurality of funding accounts is used in a transaction.

10. The computer-implemented method in accordance with claim 9, further comprising quantifying, using the one or more processors, the abnormality, the quantifying being based on the plurality of variables.

11. The computer-implemented method in accordance with claim 10, further comprising generating, using the one or more processors, a fraud score for the current activity on the payment instrument and current activity across the plurality of funding accounts, the fraud score being based on the quantifying an extent of the abnormality.

12. The computer-implemented method in accordance with claim 6, further comprising updating, using the one or more processors, the plurality of variables based on the monitoring of current activity on the payment instrument and current activity across the plurality of funding accounts.

13. A system for multiple payment account funding analytics, the system comprising:

one or more processors; and a tangibly embodied machine-readable medium embodying instructions that, when performed, cause the one or more processors to:

generate a payment instrument profile by compiling past activity on a payment instrument used to perform a plurality of transactions and past activity across a plurality of funding accounts associated with the payment instrument, data associated with the at least one funding account of the plurality of funding accounts being removed from the payment instrument profile in favor of a new funding account when the at least one funding account is inactive, the at least one funding account being inactive when the at least one funding account is accessed at a frequency less than a threshold; and monitor current activity on the payment instrument and current activity across the plurality of funding accounts associated with the payment instrument to detect an abnormality against the payment instrument profile, the abnormality being an outlier value of a variable determined by analyzing the current activity on the payment instrument and the current activity across the plurality of funding accounts against a probability of a funding account selected from the plurality of funding accounts being used for a financial transaction within the current activity on the payment instrument and current activity across plurality of funding accounts associated with the payment instrument, the plurality of funding accounts being used to pay for the plurality of transactions in real time or subsequent to the plurality of transactions.

14. The computer-implemented method in accordance with claim 1, wherein the removal of the at least one funding account in favor of the new funding account occurs in real time.

15. The system in accordance with claim 13, wherein the instructions, when performed, cause the one or more processors to compute a favorites list of activity based on the payment instrument profile and the plurality of funding accounts associated with the payment instrument, the favorites list of activity representing a normalcy of behavior of a user of the payment instrument.

16. The system in accordance with claim 13, wherein the instructions, when performed, cause the one or more processors to determine one or more similarities or one or more differences in behaviors of a user of the payment instrument across the plurality of funding accounts.

17. The system in accordance with claim 13, further comprising a communication interface for receiving data representing the current activity on the payment instrument and the current activity across the plurality of funding accounts associated with the payment instrument.

18. The system in accordance with claim 13, wherein the payment instrument accesses each funding account to pay for corresponding one or more types of transactions of the plurality of transactions.

19. The system in accordance with claim 18, wherein:

the plurality of accounts comprise a credit account, a debit account, a demand deposit account, and a points account;

the types of transactions comprise electronics, groceries, daycare charges, and restaurants; and the payment instrument accesses the credit account to pay for the electronics, the payment instrument accesses the debit card account to pay for the groceries, the payment instrument accesses the demand deposit account to pay for the daycare charges, and the payment instrument accesses the points account to pay for the restaurants.

* * * * *